United States Patent
Shemo et al.

(10) Patent No.: US 6,258,140 B1
(45) Date of Patent: Jul. 10, 2001

(54) POLISHING COMPOSITION

(75) Inventors: David M. Shemo; W. Scott Rader; Toshiki Owaki, all of Tualatin, OR (US)

(73) Assignee: Fujimi America Inc., Wilsonville, OR (US)

( * ) Notice: Subject to any disclaimer, the term of this patent is extended or adjusted under 35 U.S.C. 154(b) by 0 days.

(21) Appl. No.: 09/404,993

(22) Filed: Sep. 27, 1999

(51) Int. Cl.[7] ............... C09G 1/02; C09G 1/04; C09K 3/14
(52) U.S. Cl. ............... 51/308; 106/3; 510/165; 510/167
(58) Field of Search ............ 51/307, 308, 309; 106/3; 510/165, 397, 167; 252/79.1, 79.4

(56) References Cited

U.S. PATENT DOCUMENTS

| | | | |
|---|---|---|---|
| 4,954,142 | * 9/1990 | Carr et al. | 51/309 |
| 4,956,015 | * 9/1990 | Okajima et al. | 106/3 |
| 5,084,071 | * 1/1992 | Nenadic et al. | 51/309 |
| 5,366,542 | * 11/1994 | Yamada et al. | 51/309 |
| 5,527,423 | * 6/1996 | Neville et al. | 106/3 |
| 5,733,819 | * 3/1998 | Kodama et al. | 106/3 |
| 5,783,489 | * 7/1998 | Kaufman et al. | 51/309 |
| 5,858,813 | * 1/1999 | Scherber et al. | 438/693 |
| 5,954,997 | * 9/1999 | Kaufman et al. | 252/79.1 |
| 5,962,388 | * 10/1999 | Sherry et al. | 510/238 |
| 5,997,620 | * 12/1999 | Kodama et al. | 51/308 |
| 6,007,592 | * 12/1999 | Kasai et al. | 51/309 |
| 6,099,604 | * 8/2000 | Sandhu et al. | 51/307 |
| 6,117,220 | 9/2000 | Kodama . | |

FOREIGN PATENT DOCUMENTS

| | | |
|---|---|---|
| 01263186 | 10/1989 | (JP) . |
| 05059351 | 3/1993 | (JP) . |
| 9279127 | 10/1997 | (JP) . |
| 10036818 | 2/1998 | (JP) . |

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A polishing composition for polishing a memory hard disk, which comprises the following components (a) to (d):

(a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide, (b) from 0.0001 to 3.0 wt %, based on the total amount of the polishing composition, of at least one polishing resistance-reducing agent selected from the group consisting of a surfactant, a water-soluble polymer and a polyelectrolyte, (c) from 0.001 to 40 wt %, based on the total amount of the polishing composition, of at least one polishing accelerator selected from the group consisting of an inorganic acid, an organic acid and their aluminum, iron, nickel and cobalt salts, and (d) water.

19 Claims, No Drawings

POLISHING COMPOSITION

BACKGROUND OF THE INVENTION

1. Field of the Invention

The present invention relates to a polishing composition useful for final polishing of the surface of a magnetic disk substrate in the preparation of a substrate for a magnetic disk to be used for a memory hard disk, i.e. a memory device useful for e.g. a computer. More particularly, the present invention relates to a polishing composition to be used for the preparation of a memory hard disk represented by e.g. a Ni—P disk, a Ni—Fe disk, an aluminum disk, a boron carbide disk or a carbon disk, particularly a polishing composition which provides a high stock removal rate in a polishing process for finishing a highly specular surface with a good surface roughness and which, at the same time, is applicable to a production technique for obtaining an excellent finished surface which is useful for a magnetic disk device having a large capacity and a high recording density. Further, the present invention relates to a method for polishing a memory hard disk employing such a polishing composition.

2. Discussion of Background

There have been continuing efforts for miniaturization and larger capacity for memory hard disks to be used for magnetic disk devices which are one of memory media for e.g. computers, and magnetic media are being changed from conventional coating type media to thin film media prepared by sputtering, plating or other methods.

A disk substrate (hereinafter referred to simply as "a substrate") which is most widely used at present, is one having an electroless Ni—P plating film formed on a blank material. Here, the blank material is one obtained by fairing an aluminum or other base plate by lathe processing by diamond turning, lapping by means of a PVA grindstone prepared by fixing SiC grinding material or other methods for the purpose of parallelization or planarization. However, by such various fairing methods, a relatively large waviness can not completely be removed. And, the electroless Ni—P plating film will be formed along the waviness on the blank material. Accordingly, such a waviness will remain also on the substrate, and nodules or large pits will sometimes be formed. Here, the "nodules" are bulges having a diameter of at least about 50 $\mu$m, which are formed by bulging of a plating surface at such portions that impurities have been taken into the Ni—P plating film. The "pits" are dents formed by polishing on the surface of the substrate, and "fine pits" are dents having a diameter of less than about 10 $\mu$m, among them.

On the other hand, along with the increase in the capacity of memory hard disks, the surface recording density is increasing at a rate of a few tens % per year. Accordingly, the space on a memory hard disk occupied by a predetermined amount of recorded information, is narrower than ever, and the magnetic force required for recording tends to be weak. Accordingly, for recent magnetic disk devices, it is required to minimize the flying height of the head, which is a space between the magnetic head and the memory hard disk, and at present, the flying height of the head is reduced to a level of not higher than 1.0 $\mu$inch (about 0.025 $\mu$m).

Further, so-called texturing may sometimes be carried out to impart concentric circular scorelines to the substrate after polishing for the purposes of preventing sticking of the magnetic head for reading or writing information, to the memory hard disk and preventing non-uniformity of the magnetic field on the memory hard disk due to scorelines in a certain direction different from the rotational direction of the memory hard disk, formed on the substrate surface by polishing. Recently, for the purpose of further reducing the flying height of the head, light texturing is carried out wherein the scorelines formed on the substrate are further reduced, or a non-texture substrate free from scorelines, is employed which is not subjected to texturing. The technology to support such a low flying height of the magnetic head has also been developed, and the reduction of the flying height of the head is being increasingly advanced.

When a memory hard disk surface has a waviness, the head moves up and down following the waviness of the memory hard disk which is rotated at a very high speed. However, if the waviness exceeds a certain height, the head will no longer be able to follow the waviness, and the head will collide against the substrate surface, thus resulting in so-called "head crush", whereby the magnetic head or the magnetic medium on the memory hard disk surface may be damaged, which may cause a trouble to the magnetic disk device, or which may cause an error in reading or writing information.

On the other hand, head crush may occur also when a micro protrusion of a few $\mu$m is present on the memory hard disk surface. Further, when a pit is present on a memory hard disk, it is likely that information can not completely be written in, thus leading to a defect of information so-called a "bit defect" or failure in reading the information, which causes an error.

Accordingly, it is important to minimize the surface roughness of the substrate in the polishing step i.e. the step prior to forming a magnetic medium, and at the same time, it is necessary to completely remove a relatively large waviness as well as micro protrusions, fine pits and other surface defects.

For the above purpose, it used to be common to carry out finishing by one polishing step by means of a polishing composition (hereinafter sometimes referred to as a "slurry" from its nature) comprising aluminum oxide or other various abrasives and water as well as various polishing accelerators. However, by a single polishing step, it has been difficult to satisfy all of the requirements for removing a relatively large waviness as well as surface defects such as nodules and large pits on the substrate surface and for minimizing the surface roughness within a certain period of time. Accordingly, a polishing process comprising two or more steps, has been studied.

In a case where the polishing process comprises two steps, the main purpose of the polishing in the first step will be to remove a relatively large waviness as well as surface defects such as nodules and large pits on the substrate surface, i.e. fairing. Accordingly, a polishing composition is required which has a high ability of correcting the above-mentioned waviness and surface defects without forming deep scratches which can not be removed by polishing in the second step, rather than minimizing the surface roughness.

The purpose of polishing in the second step i.e. finishing or final polishing, is to minimize the surface roughness of the substrate. Accordingly, it is important that the polishing composition is capable of minimizing the surface roughness and capable of preventing formation of micro protrusions, fine pits or other surface defects rather than it has a high ability for correcting a large waviness or surface defects as required for polishing in the first step. Further, from the viewpoint of the productivity, it is also important that the stock removal rate is high. So far as the present inventors are aware, in the conventional two step polishing, it was possible to obtain a substrate surface having a good surface roughness in the polishing in the second step, but the stock removal rate was very low and inadequate for practical production. The degree of the surface roughness is determined depending upon the process for producing the substrate, the final recording capacity as a memory hard disk and other conditions. However, depending upon the desired degree of surface roughness, a polishing process comprising more than two steps, may be employed.

For the above purpose, particularly in finishing polishing in a two step process, it has been common to carry out polishing by means of a polishing composition prepared in such a manner that aluminum oxide or other abrasive is thoroughly pulverized and adjusted for proper particle size, water is added thereto, and aluminum nitrate or various organic acids and other polishing accelerators are incorporated thereto, or a polishing composition comprising colloidal silica and water. However, the polishing by means of the former polishing composition had a problem that the balance between the mechanical component and the chemical component was poor, and micro protrusions or fine pits tended to form. The polishing by means of the latter polishing composition had a problem such that the stock removal rate was so low that it took a long time for polishing, and the productivity was low, roll off (or "dub off") as an index of sagging of an end face of the substrate tended to deteriorate, or washing after the polishing tended to be difficult.

In order to solve the above problems, it has been proposed to employ a polishing composition having various additives for accelerating the processing added to colloidal silica, in final polishing of a substrate to be used for a memory hard disk. For example, JP-A-9-204657 discloses a polishing composition having aluminum nitrate and a stabilizer incorporated to colloidal silica, JP-A-10-204416 discloses a polishing composition having an iron compound incorporated to colloidal silica, and JP-A-11-167714 proposes a polishing composition having hydrogen peroxide incorporated to colloidal silica. Further, it has been proposed to use fumed silica in JP-A-9-208934, titanium oxide in JP-A-10-121035 and zirconium oxide in JP-A-10-121034, instead of aluminum oxide as the conventional abrasive for polishing compositions. These proposals are directed to present polishing compositions capable of providing a polished surface with small surface roughness and little microprotrusions, micropits or other surface defects, as used to be desired for polishing compositions.

The present inventors have tested these compositions and have confirmed that these conventional polishing compositions are effective to reduce the surface roughness and surface defects as intended, although the effectiveness varies among the compositions. However, at the same time, it has been found that these compositions have a problem such that when they are used for polishing substrates by means of a double side polishing machine, chattering or carrier noise of a carrier for holding such a substrate, is large, and in an extreme case, a chamfer portion which is a peripheral face of the substrate, is likely to be damaged by collision of the substrate and the carrier.

When a double side polishing machine is used for polishing the surface of a magnetic disk substrate, the substrate is supported by a carrier. The carrier is held between a planetary gear (internal gear) along the outer periphery of the polishing machine and a sun gear at the center of the polishing machine. At the time of polishing, the substrate is acted on and polished via the gear and the carrier. At that time, if the friction between the substrate and the carrier at a clearance (a so-called play which is not required for transmission of the action) provided between the carrier and the gear of the polishing machine, is non-uniform in the interior of the polishing machine, the substrate and the carrier respectively undergo vibration, whereby a vibration noise which is a so-called chattering or carrier noise will be generated as a whole. If the chattering is caused by the vibration of the substrate in the carrier, in an extreme case, the outer periphery of the substrate will collide with the inner periphery of the carrier, thus leading to a damage of the chamfer, as mentioned above.

SUMMARY OF THE INVENTION

The present invention provides a polishing composition for polishing a memory hard disk, which comprises the following components (a) to (d):

(a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide, (b) from 0.0001 to 3.0 wt %, based on the total amount of the polishing composition, of at least one polishing resistance-reducing agent selected from the group consisting of a surfactant, a water-soluble polymer and a polyelectrolyte, (c) from 0.001 to 40 wt %, based on the total amount of the polishing composition, of at least one polishing accelerator selected from the group consisting of an inorganic acid, an organic acid and their aluminum, iron, nickel and cobalt salts, and (d) water.

Further, the present invention provides a method for producing a memory hard disk, which comprises polishing a substrate for a memory hard disk by means of a polishing composition for polishing a memory hard disk, wherein said polishing composition comprises the following components (a) to (d):

(a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide, (b) from 0.0001 to 3.0 wt %, based on the total amount of the polishing composition, of at least one polishing resistance-reducing agent selected from the group consisting of a surfactant, a water-soluble polymer and a polyelectrolyte, (c) from 0.001 to 40 wt %, based on the total amount of the polishing composition, of at least one polishing accelerator selected from the group consisting of an inorganic acid, an organic acid and their aluminum, iron, nickel and cobalt salts, and (d) water.

The polishing composition for a memory hard disk of the present invention has a high stock removal rate and is capable of providing a polished surface having a small surface roughness, and it is further capable of preventing formation of microprotrusions, micropits or other surface defects. Further, when the polishing composition of the present invention is used for polishing a memory disk, chattering of the carrier during polishing can be reduced, whereby it is possible to reduce the damage to the chamfer portion of the substrate due to collision between the substrate and the carrier.

Further, according to the method for producing a memory hard disk of the present invention, the stock removal rate is high, whereby the productivity is high, and it is possible to obtain a memory hard disk with a small surface roughness and little microprotrusions, micropits or other surface defects. Further, by the reduction of chattering of the carrier during the polishing, it is possible to reduce the damage to the chamfer portion of the substrate due to collision between the substrate and the carrier.

DETAILED DESCRIPTION OF THE PREFERRED EMBODIMENTS

Abrasive

The abrasive which is suitable for use as the main abrasive among the components of the polishing composition of the present invention, is selected from the group consisting of silicon dioxide, aluminum oxide, cerium oxide, titanium oxide, silicon nitride, zirconium oxide and manganese dioxide. The abrasive is not limited to any particular one of these, but is preferably silicon dioxide.

Silicon dioxide includes colloidal silica, fumed silica and many other types which are different in the methods for their production or in their properties.

Also, aluminum oxide includes α-alumina, δ-alumina, θ-alumina, κ-alumina and other morphologically different substances. Further, it includes one called fumed alumina from the method for its production.

Cerium oxide includes trivalent and tetravalent ones from the oxidation numbers, and it includes hexagonal system, isometric system and face-centered cubic system ones from the crystal systems.

Zirconium oxide includes monoclinic system, tetragonal system and amorphous ones from the crystal systems. Further, it includes one called fumed zirconia from the method for its production.

Titanium oxide includes titanium monoxide, dititanium trioxide, titanium dioxide and others from the crystal systems. Further, it includes one called fumed titania from the method for its production.

Silicon nitride includes α-silicon nitride, β-silicon nitride, amorphous silicon nitride and other morphologically different silicon nitrides.

Manganese dioxide includes α-manganese dioxide, β-manganese dioxide, γ-manganese dioxide, δ-manganese dioxide, ε-manganese dioxide, η-manganese dioxide and others from its morphology.

For the composition of the present invention, these abrasives may be employed in optional combination as the case requires. When they are used in combination, the manner of the combination, and the proportions of the respective abrasives are not particularly limited.

Among these abrasives, colloidal silica, colloidal alumina, fumed silica, fumed alumina, fumed titania and fumed zirconia are preferred to be used as the abrasive of the present invention, since their particle sizes are small. Among them, colloidal silica or fumed silica is most preferred.

The above abrasive is to polish a surface to be polished by a mechanical action as abrasive grains. Among them, the particle size of silicon dioxide is usually from 0.005 to 0.5 μm, preferably from 0.01 to 0.2 μm, as the average particle size obtained by the surface area measured by BET method. Likewise, the particle sizes of aluminum oxide, zirconium oxide, titanium oxide and silicon nitride are usually from 0.01 to 1 μm, preferably from 0.05 to 0.3 μm, as the average particle sizes measured by a laser diffraction particle size distribution measuring apparatus. Further, the particle sizes of cerium oxide and manganese dioxide are usually from 0.01 to 1 μm, preferably from 0.05 to 0.3 μm, as the average particle sizes observed by a scanning electron microscope.

If the average particle sizes of these abrasives exceed the above-mentioned ranges, the surface roughness of the polished surface tends to be bad, or scratching is likely to result. On the other hand, if they are less than the above-mentioned ranges, the stock removal rate tends to be very low and impractical.

The content of the abrasive in the polishing composition varies depending upon the type of the abrasive to be used. When the abrasive is silicon dioxide or aluminum oxide, it is usually from 0.5 to 30 wt %, preferably from 1.0 to 10 wt %, based on the total amount of the composition. When the abrasive is titanium oxide, silicon nitride or manganese dioxide, it is usually from 0.1 to 30 wt %, preferably from 0.5 to 15 wt %. When the abrasive is cerium oxide or zirconium oxide, it is usually from 0.5 to 50 wt %, preferably from 1 to 25 wt %. If the content of the abrasive is too small, the stock removal rate tends to be low, and if it is too large, uniform dispersion can not be maintained, and the viscosity of the composition tends to be so high that the handling will be difficult.

Polishing Resistance-reducing Agent

The polishing composition of the present invention is characterized in that it contains a polishing resistance-reducing agent. Such an agent is added to reduce the chattering or carrier noise generated between the substrate to be polished and the carrier for holding it, during polishing by a double side polishing machine in particular. As the agent to reduce the polishing resistance, the following may be mentioned:

(a) an anionic surfactant such as an alkyl sulfate, an alkyl sulfonate or an alkylaryl sulfonate, (b) a cationic surfactant such as a higher amine halide acid salt or a quaternary ammonium salt, (c) a nonionic surfactant such as a polyethylene glycol alkyl ether or a polyethylene glycol fatty acid ester, (d) a water-soluble polymer such as a polyvinyl alcohol or a polyethylene oxide, (e) a water-soluble electrolyte such as salts of polyacrylic acid or polymethacrylic acid.

The surfactant may be a nitrogen derivative selected from the group consisting of fatty amines, amine salts, quaternary ammonium compounds, amine oxides and amides.

Among these agents, a quaternary ammonium salt as cationic surfactant, particularly an ethoxylated cocoalkyl quaternary ammonium salt, is preferred as an agent which is particularly effective for reducing the polishing resistance and which is capable of reducing scratches or other surface defects and providing a low surface roughness after the polishing.

The content of the polishing resistance-reducing agent in the polishing composition of the present invention varies depending upon the effect of the particular compound. However, it is usually preferably from 0.0001 to 3.0 wt %, more preferably from 0.001 to 0.1 wt %. Since the polishing resistance-reducing agent can affect the slurry's colloidal stability and viscosity when present in excessive concentrations, the amount of the polishing resistance-reducing agent to be added, is usually at most 0.05 mg, preferably at most 0.03 mg, per square meter of the total surface area of the polishing agent. If the amount of the polishing resistance-reducing agent is too large, it also hinders mechanical polishing by the abrasive, whereby the polishing efficiency will be extremely low, and it will take a long time for polishing, such being uneconomical.

Polishing Accelerator

In the polishing composition of the present invention, the polishing accelerator may be at least one member selected from the following group:

(a) an organic acid, such as ascorbic acid, citric acid, glycolic acid, glycine, glyceric acid, gluconic acid, glutamic acid, gluoxylic acid, succinic acid, tartaric acid, lactic acid, malonic acid, mandelic acid and malic acid, (b) a salt of an organic acid or an inorganic acid with aluminum, iron, nickel or cobalt, such as aluminum nitrate, aluminum sulfate, ammonium aluminum sulfate, aluminum perchlorate, aluminum chloride, aluminum citrate, ammonium aluminum citrate, aluminum oxalate, iron nitrate, iron sulfate, ammonium iron sulfate, iron perchlorate, iron chloride, iron citrate, ammonium iron citrate, ammonium iron oxalate, nickel nitrate, nickel sulfate, nickel perchlorate, nickel chloride, nickel citrate, nickel oxalate, cobalt nitrate, cobalt sulfate and cobalt chloride, (c) a chelate salt of iron, nickel or cobalt, such as a chelate salt of ethylenediaminetetraacetic acid, diethylenetriaminepentaacetic acid, propylenediaminetetraacetic acid, hydroxyethylethylenediaminetriacetic acid, glycol ether diaminetetraacetic acid, nitrilotriacetic acid, hydroxyethyliminodiacetic acid, dihydroxyethyl glycine or triethylenetetraaminehexaacetic acid.

The content of the polishing accelerator in the polishing composition of the present invention varies depending upon the effects of the particular compound. When the polishing accelerator is an organic acid, it is preferably from 0.01 to 40 wt %, more preferably from 0.05 to 10 wt %. When the polishing accelerator is an inorganic acid salt, it is preferably from 0.01 to 40 wt %, more preferably from 0.05 to 10 wt %. When the polishing accelerator is an organic acid salt, it is preferably from 0.01 to 40 wt %, more preferably from 0.05 to 10 wt %. When the polishing accelerator is a chelate salt, it is preferably from 0.01 to 40 wt %, more preferably from 0.05 to 10 wt %.

It is expected that by increasing the amount of the polishing accelerator, the polishing efficiency will be increased, and the polishing time can be shortened, whereby the economical effects will be improved. However, if the polishing accelerator concentration is too high, the degree of improvement tends to be small, whereby not only an economical demerit is likely to result, but also the chemical action tends to be too great, and such may be a factor for formation of surface defects such as pits.

Polishing Composition

The polishing composition of the present invention is prepared usually by mixing and dispersing an abrasive selected from the group consisting of silicon dioxide, aluminum oxide, cerium oxide, zirconium oxide, titanium oxide, silicon nitride and manganese dioxide in water at an optional concentration, and further dissolving the polishing accelerator and the polishing resistance-reducing agent therein. The method for dispersing or dissolving these components in water is optional. For example, they may be dispersed by stirring by a vane-type stirring machine or by ultrasonic dispersion. Further, the order of mixing them is optional, and either dispersion of the abrasive or dissolution of the polishing accelerator and the polishing resistance-reducing agent may be carried out first, or such dispersion and dissolution may simultaneously be carried out.

Further, at the time of preparing the above polishing composition, various known additives may further be added for the purposes of stabilizing or maintaining the quality of the product, or depending upon the type of the object to be treated, the polishing conditions or the necessity for other processing conditions. Preferred examples of such additives include (a) cellulose, carboxymethylcellulose and hydroxyethylcellulose, and other celluloses, (b) ethanol, propanol and ethylene glycol, and other water-soluble alcohols, (c) sodium arginate, potassium hydrogencarbonate, and other bactericides.

Further, the polishing composition of the present invention may be prepared and stored or transported in the form of a stock solution having a relatively high concentration, and may be used by diluting it at the time of the actual polishing treatment. The above-mentioned preferred ranges of concentration are concentrations at the time of actual polishing treatment. Needless to say, when such a method of use is employed, the polishing composition will be a solution having a higher concentration in the state in which it is stored or transported. Further, from the viewpoint of the handling efficiency, it is preferred that the polishing composition is prepared in such a concentrated form.

With respect to a reason as to why the polishing composition of the present invention is effective for reducing the carrier noise during polishing by means of a double side polishing machine, no detailed mechanism has been known. However, the following explanation may be made with reference to a case of a Ni—P plated substrate as an example.

It is believed that the noise, commonly referred to as "chattering" of "carrier noise", observed during double-side polishing of hard-disk substrates originates from friction between the disk surface and polishing pad material. This is supported by experimental observations of sound level reduction as volume fraction of particulate material (the polishing abrasive) in the polishing slurry is increased. Sound level is generally observed to be highest when no abrasive material is present, in which case the direct contact area between pad and disk surfaces is maximum. Addition of abrasive particles reduces the contact area between the pad material and disk surface. However, at the low abrasive concentrations typically used in many polishing slurry compositions, there is still significant contact area between the pad material and disk surface. In this invention, the friction generated at the disk-pad contact area is reduced by adsorbing surfactant or polymer molecules onto the disk and/or pad surface. Such adsorbed molecular layers are believed to make the disk and pad surfaces hydrophilic and provide a lubricative effect between the disk surface and pad material.

In using this approach to formulate an effective polishing slurry with low chattering noise, it is also necessary to consider the degree of undesirable lubrication introduced at the abrasive/disk interface. Lubrication at the abrasive/disk contact hinders abrasion of the disk material, which results in lowered polishing stock removal rate. To minimize this effect, it is believed that the preferred lubricating adsorbate be relatively low in molecular weight and present at a minimal concentration. Furthermore, it is also necessary to select this additive such that the type and concentration employed do not adversely affect the colloidal stability of the polishing slurry.

Preparation of a Memory Hard Disk

The method for preparing a memory hard disk according to the present invention, comprises polishing a memory hard disk by means of the above-described polishing composition.

The substrate of the memory hard disk to be polished may, for example, be a Ni—P disk, a Ni—Fe disk, an aluminum disk, a boron carbide disk, a carbon disk or the like. Among them, it is preferred to employ a Ni—P disk or an aluminum disk.

The method for preparing a memory hard disk of the present invention may employ any conventional polishing method for a memory hard disk or any combination of polishing conditions, so long as the above-described polishing composition is used.

For example, the polishing pad may be of a suede type, a non-woven type, a flocked type, a raising type or the like.

Further, as the polishing machine, a single side polishing machine, a double side polishing machine or other machines may be employed. However, especially when a double side polishing machine is employed, it is effective to use the polishing composition of the present invention, since it is thereby possible to effectively prevent damage by chattering or carrier noise.

Further, the polishing composition used in the method for preparing a memory hard disk of the present invention has a high stock removal rate and at the same time provides a flat polished surface. Accordingly, the polishing process can be carried out in one step, or can be carried out in two or more steps under different polishing conditions. In a case where the polishing process is carried out in two or more steps, it is preferred that the polishing step employing the above-described polishing composition will be the final polishing step, i.e. a preliminarily polished substrate will be polished by means of the above-described polishing composition. Further, to carry out the polishing by the polishing composition of the present invention more efficiently, it is advisable to adjust the surface roughness of the preliminarily polished substrate to be Ra=at most 20 Å as measured by a contact surface roughness meter.

Now, the polishing composition of the present invention will be described in further detail with reference to Examples. However, it should be understood that the present invention is by no means restricted to such specific Examples.

Preparation of Polishing Compositions

Firstly, colloidal silica (specific surface area: 80 m$^2$/g) and various additives were mixed in the proportions as identified in Table 1 to obtain test samples of Examples 1 to 5 and Comparative Examples 1 to 3.

TABLE 1

|  | C—SiO$_2$ wt % | EDTA-Fe wt % | Polishing resistance reducing agent Type | wt % |
|---|---|---|---|---|
| Example 1 | 23.93 | 5.13 | CCAM | 0.096 |
| Example 2 | 33.65 | 4.80 | CCAM | 0.014 |
| Example 3 | 33.65 | 4.80 | CCAM | 0.027 |
| Example 4 | 33.47 | 7.17 | CCAM | 0.027 |
| Example 5 | 33.47 | 7.17 | CCAM | 0.134 |
| Example 6 | 28.17 | 4.99 | OCDM | 0.022 |
| Example 7 | 33.47 | 7.17 | OCDM | 0.027 |
| Example 8 | 33.47 | 7.17 | OCDM | 0.134 |
| Example 9 | 33.47 | 7.17 | TLAM | 0.027 |
| Example 10 | 33.47 | 7.17 | PAL | 0.027 |
| Example 11 | 33.47 | 7.17 | PAL | 0.067 |
| Example 12 | 33.47 | 7.17 | PAL | 0.134 |
| Example 13 | 33.47 | 7.17 | PAL | 0.268 |
| Example 14 | 33.47 | 7.17 | PEO | 0.026 |
| Example 15 | 33.47 | 7.17 | PVA | 0.026 |
| Comparative Example 1 | 23.93 | 5.13 | Nil | — |
| Comparative Example 2 | 33.65 | 4.80 | Nil | — |
| Comparative Example 3 | 33.47 | 7.17 | Nil | — |

C-SiO$_2$: Colloidal silica (specific surface area: 80 m$^2$/g)
CCAM: Cocoalkyl methyl ethoxylated quarternary ammonium chloride
OCAM: Octadecyl methyl ethoxylated quarternary ammonium chloride
TLAM: Ethoxylated tellowalkylamine
PAL: NH$_4$-polyacrylate
PEO: Polyethylene oxide (Molecular weight = ~100,000)
PVA: Polyvinyl alcohol (Molecular weight = ~22,000)

Polishing Test

Then, using the above polishing composition and a substrate preliminarily polished by DISKLITE-2008 (manufactured by Fujimi Incorporated), a polishing test was carried out. The polishing conditions were as follows.

Polishing Conditions
  Polishing machine: Double side polishing machine
  Object to be polished: 3.5" electroless Ni—P substrate (already polished in the first step; surface roughness Ra=16 Å)
  Number of sheets polished: 2 sheets/1 carrier×5 carriers×2 tests=20 sheets
  Polishing pad: Politex DG-Hi (manufactured by Rodel Inc., U.S.A.)
  Treating pressure: 60 g/cm$^2$
  Platen rotational speed: 40 rpm
  Dilution of the composition: 1 part of the composition: 2 parts of deionized water (volume ratio)
  Supply rate of the polishing composition: 100 cc/min
  Polishing time: 12 minutes To measure the carrier noise during polishing, a noise meter was used, and the noise was measured during polishing, whereby an index was determined in accordance with the following five levels of calculated values, and the noise level during polishing was obtained as an average of two measurements.

Measuring Conditions
  Measuring apparatus: Sper Scientific Sound meter #840029
  Measuring range: 50 to 100 dB
  Measuring mode: fast response mode
  Frequency weighting mode: Mode C
  Distance from the polishing machine to the measuring apparatus: 50 inches Noise level

| Noise level (5 levels) | Time where the noise is at least 74 dB (seconds per polishing for 1 minute) | Maximum noise (dB) |
|---|---|---|
| 0 | 0 | Less than 74 |
| 1 | Less than 10 | 74 to 77 |
| 2 | Less than 20 | 77 to 79 |
| 3 | Less than 30 | 79 to 81 |
| 4 | Less than 40 | 81 to 83 |
| 5 | At least 50 | At least 83 |

*Judged based on the noise (maximum:74 dB) during polishing where no carrier noise is generated.

After the polishing, the substrate was sequentially cleaned and dried, and then, the weight reduction of the substrate by the polishing was measured. The measurement was carried out with respect to all of the 20 sheets polished, and the stock removal rate was obtained from the average.

Further, using a contact surface roughness meter, Tencor P12 (manufactured by Tencor Instruments Co., U.S.A.), the surface roughness at the center in the radial direction of the substrate, was measured. Such measurement was carried out at two locations per sheet of the substrate×4 sheets=a total of 8 measurements, and the surface roughness was obtained from the average of the eight measurements.

Further, using a differential interference microscope (400×magnification), the number of pits formed on the substrate surface was measured. The number of pits observed within a range of one linear line extending radially from the center of the substrate towards the periphery, was counted. Such measurement was carried out at two locations per sheet of the substrate×4 sheets=a total of 8 measurements, and the number of pits was obtained from the average of the eight measurements.

Still further, the number of scratches visually observed under a spotlight in a dark room, was counted on the entire surface of each of the front and rear sides of the disk, and such counting was carried out with respect to all of the 20 sheets polished, and the number of scratches was obtained from the average of a total of 40 measurements (the front and rear sides of 20 sheets). The obtained results were as shown in Table 2.

TABLE 2

|  | Noise level (5 levels) | Polishing efficiency (μm/min) | Scratches (number/ surface) | Pits (number/ 2 lines) | Surface roughness Ra (Å) |
|---|---|---|---|---|---|
| Example 1 | 3.0 | 0.10 | 0.75 | 13.8 | 2.80 |
| Example 2 | 2.5 | 0.12 | 0.45 | 9.3 | 2.78 |
| Example 3 | 1.8 | 0.10 | 0.25 | 11.3 | 3.11 |
| Example 4 | 1.5 | 0.11 | 0.45 | 14.5 | 2.90 |
| Example 5 | 1.0 | 0.11 | 1.50 | 17.3 | 3.20 |
| Example 6 | 3.0 | 0.11 | 0.50 | 11.8 | 2.35 |
| Example 7 | 3.0 | 0.12 | 0.90 | 13.0 | 2.75 |
| Example 8 | 3.0 | 0.09 | 0.85 | 11.8 | 2.46 |
| Example 9 | 3.0 | 0.11 | 0.45 | 11.5 | 2.39 |
| Example 10 | 1.0 | 0.09 | 0.30 | 12.0 | 3.00 |
| Example 11 | 0.5 | 0.08 | 0.35 | 11.0 | 3.10 |
| Example 12 | 0.5 | 0.07 | 0.20 | 13.0 | 3.30 |
| Example 13 | 0.5 | 0.06 | 0.25 | 9.3 | 3.50 |
| Example 14 | 3.0 | 0.10 | 0.65 | 12.5 | 3.00 |
| Example 15 | 2.0 | 0.12 | 0.45 | 18.0 | 3.10 |
| Comparative Example 1 | 4.0 | 0.11 | 0.83 | 8.9 | 2.80 |
| Comparative Example 2 | 3.3 | 0.12 | 0.85 | 11.3 | 3.00 |
| Comparative Example 3 | 3.5 | 0.12 | 0.78 | 12.6 | 3.10 |

From the results shown in Table 2, it is evident that the polishing composition of the present invention has a low noise level during polishing, as compared with the polishing compositions containing no polishing resistance-reducing agent and is capable of suppressing generation of a noise caused by e.g. chattering during the polishing.

As described in the foregoing, the polishing composition for a memory hard disk of the present invention has a high stock removal rate and is capable of providing a polished surface having a small surface roughness and capable of preventing formation of microprotrusions, micropits or other surface defects. Further, when the polishing composition of the present invention is used for polishing a memory hard disk, the carrier noise during the polishing can be reduced, whereby a damage to the chamfer portion of the substrate due to collision of the substrate and the carrier, can be reduced, as mentioned above.

What is claimed is:

1. A polishing composition which comprises the following components (a) to (d):
   (a) from 0.1 to 50 wt %, based on the total amount of the polishing composition, of at least one silicon dioxide abrasive,
   b) from 0.0001 to 3.0 wt %, based on the total amount of the polishing composition, of at least one polishing resistance-reducing agent selected from the group consisting of a higher amine halide acid salt, a quaternary ammonium salt, a polyvinyl alcohol, a polyethylene oxide, and salt of polyacrylic acid,
   (c) from 0.001 to 40 wt %, based on the total amount of the polishing composition, of at least one polishing accelerator selected from the group consisting ethylenediaminetetraacetate-coordinated iron ion, ethylenediaminetetraacetate-coordinated nickel ion, and ethylenediaminetetraacetate-coordinated cobalt ion, and
   (d) water.

2. The polishing composition according to claim 1, wherein the polishing resistance-reducing agent (b) is selected from the group consisting of a higher amine halide acid salt, and a quaternary ammonium salt.

3. The polishing composition according to claim 1, wherein said polishing resistance-reducing agent (b) is an ethoxylated cocoalkyl quaternary ammonium chloride.

4. The polishing composition according to claim 1, wherein said polishing resistance-reducing agent (b) is an ethoxylated cocoalkyl quaternary ammonium chloride and is present in an amount of at most 0.05 mg/m$^2$, based on the specific surface area of the silicon dioxide abrasive.

5. The polishing composition according to claim 1, wherein said polishing resistance-reducing agent (b) is selected from the group consisting of cocoalkyl methyl ethoxylated quaternary ammonium chloride, ethoxylated tallowalkylamine, $NH_4$-polyacrylate, polyethylene oxide and polyvinyl alcohol.

6. The polishing composition according to claim 1, wherein said silicon dioxide abrasive is selected from the group consisting of colloidal silica and fumed silica.

7. The polishing composition according to claim 1, wherein said silicon dioxide abrasive is colloidal silica.

8. The polishing composition according to claim 1, wherein said polishing accelerator (c) is ethylenediaminetetraacetate-coordinated iron ion.

9. A polishing composition which comprises the following components (a) to (d):
   (a) from 0.1 to 50 wt %, based on the total amount of the polishing composition, of at least one silicon dioxide abrasive,
   b) from 0.0001 to 3.0 wt %, based on the total amount of the polishing composition, of at least one polishing resistance-reducing agent selected from the group consisting of a higher amine halide acid salt, a quaternary ammonium salt, a polyvinyl alcohol, a polyethylene oxide, and salt of polyacrylic acid,
   (c) from 0.001 to 40 wt %, based on the total amount of the polishing composition ethylenediaminetetraacetate-coordinated iron ion, and
   (d) water.

10. A method of producing a memory hard disk, which comprises polishing a memory hard disk substrate with a polishing composition, wherein said polishing composition comprises the following components (a) to (d):
    (a) from 0.1 to 50 wt %, based on the total amount of the polishing composition, of at least one silicon dioxide abrasive,
    (b) from 0.0001 to 3.0 wt %, based on the total amount of the polishing composition, of at least one polishing resistance-reducing agent selected from the group consisting of a higher amine halide acid salt, a quaternary ammonium salt, a polyvinyl alcohol, a polyethylene oxide, and salt of polyacrylic acid,
    (c) from 0.001 to 40 wt %, based on the total amount of the polishing composition, of at least one polishing accelerator selected from the group consisting of ethylenediaminetetraacetate-coordinated iron ion, ethylenediaminetetraacetate-coordinated nickel ion, and ethylenediaminetetraacetate-coordinated cobalt ion, and
    (d) water.

11. The method according to claim 10, wherein Ni—P disk or an aluminum disk preliminarily polished once or a plurality of times, is subjected to final polishing by said polishing composition.

12. The method according to claim 11, wherein the substrate is a Ni—P disk or an aluminum disk which has a surface roughness Ra=20 Å prior to final polishing.

13. The method according to claim 10, wherein the polishing resistance-reducing agent (b) is selected from the group consisting of a higher amine halide acid salt, and a quaternary ammonium salt.

14. The method according to claim 10, wherein said polishing resistance-reducing agent (b) is an ethoxylated cocoalkyl quaternary ammonium chloride.

15. The method according to claim 10, wherein said polishing resistance-reducing agent (b) is an ethoxylated cocoalkyl quaternary ammonium chloride and is present in an amount of at most 0.05 mg/m$^2$, based on the specific surface area of the silicon dioxide abrasive.

16. The method according to claim 10, wherein said polishing resistance-reducing agent (b) is selected from the group consisting of cocoalkyl methyl ethoxylated quaternary ammonium chloride, ethoxylated tallowalkylamine, $NH_4$-polyacrylate, polyethylene oxide and polyvinyl alcohol.

17. The method according to claim 10, wherein said silicon dioxide abrasive is selected from the group consisting of colloidal silica and fumed silica.

18. The method according to claim 10, wherein said silicon dioxide abrasive is colloidal silica.

19. The method according to claim 10, wherein said polishing accelerator (c) is ethylenediaminetetraacetate-coordinated iron.

* * * * *